United States Patent
Millsap et al.

(10) Patent No.: US 10,538,267 B2
(45) Date of Patent: Jan. 21, 2020

(54) SYSTEMATIC ABNORMALITY DETECTION IN CONTROL COMMANDS FOR CONTROLLING POWER STEERING SYSTEM

(71) Applicants: STEERING SOLUTIONS IP HOLDING CORPORATION, Saginaw, MI (US); BAYERISCHE MOTORENWERKE AKTIENGESELLSCHAFT, Munich (DE)

(72) Inventors: Scott A. Millsap, Grand Blanc, MI (US); Ashok Chandy, Fenton, MI (US); Kevin L. Derry, Wheeler, MI (US); Caroline Dannöhl, München (DE); Hans-Peter Hank, München (DE); Jens Schotte, Olching (DE); Kristian Vetter, Gerolzhofen (DE)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 345 days.

(21) Appl. No.: 15/427,249

(22) Filed: Feb. 8, 2017

(65) Prior Publication Data

US 2017/0144699 A1    May 25, 2017

Related U.S. Application Data

(62) Division of application No. 14/518,370, filed on Oct. 20, 2014, now Pat. No. 9,598,102.

(Continued)

(51) Int. Cl.
*B62D 5/04* (2006.01)

(52) U.S. Cl.
CPC ........... *B62D 5/0484* (2013.01); *B62D 5/049* (2013.01); *B62D 5/0463* (2013.01); *B62D 5/0481* (2013.01); *B62D 5/0493* (2013.01)

(58) Field of Classification Search
None
See application file for complete search history.

(56) References Cited

U.S. PATENT DOCUMENTS

| | | | |
|---|---|---|---|
| 5,912,539 | A | 6/1999 | Sugitani et al. |
| 6,134,491 | A | 10/2000 | Kawagoe et al. |

(Continued)

FOREIGN PATENT DOCUMENTS

| | | |
|---|---|---|
| CN | 101177146 A | 5/2008 |
| CN | 102574540 A | 7/2012 |

(Continued)

OTHER PUBLICATIONS

Chinese Office Action for related Chinese application No. 201410811051.2, dated: Jun. 1, 2016, pp. 6.

(Continued)

*Primary Examiner* — Navid Ziaeianmehdizadeh

(57) ABSTRACT

An embodiment of a system of a vehicle includes a power steering system that operates as commanded by control commands, and a control module configured to receive a first control command. The control module is also configured to generate a range signal indicative of a range of command values based on a plurality of input signals, generate a second control command based on a subset of the plurality of input signals, determine whether the first control command is out of the range for longer than a predetermined duration of time, and send the second control command to the power steering system in response to determining the first control command is out of the range for longer than the predetermined duration of time.

18 Claims, 6 Drawing Sheets

Related U.S. Application Data

(60) Provisional application No. 61/893,455, filed on Oct. 21, 2013, provisional application No. 61/893,441, filed on Oct. 21, 2013.

(56) References Cited

U.S. PATENT DOCUMENTS

| | | | |
|---|---|---|---|
| 6,404,156 B1 | 6/2002 | Okanoue et al. | |
| 6,445,151 B1 | 9/2002 | Nakano et al. | |
| 6,499,559 B2 | 12/2002 | McCann et al. | |
| 6,738,700 B2 | 5/2004 | Chandy | |
| 2001/0041957 A1 | 11/2001 | McCann et al. | |
| 2002/0143450 A1 | 10/2002 | Fujimoto et al. | |
| 2003/0117097 A1 | 6/2003 | Iwata et al. | |
| 2007/0000717 A1* | 1/2007 | Kumaido | B62D 5/0481 180/446 |
| 2008/0006469 A1 | 1/2008 | Sasaki et al. | |
| 2008/0066994 A1 | 3/2008 | Fujita et al. | |
| 2010/0044146 A1 | 2/2010 | Kasai et al. | |
| 2010/0100283 A1 | 4/2010 | Hales et al. | |
| 2011/0054737 A1* | 3/2011 | Naik | B62D 5/0463 701/41 |
| 2011/0066331 A1* | 3/2011 | Yamashita | B62D 5/0463 701/42 |
| 2012/0191301 A1 | 6/2012 | Benyo et al. | |
| 2013/0066520 A1 | 3/2013 | Hales et al. | |
| 2013/0066523 A1 | 3/2013 | Iwamoto et al. | |
| 2013/0151078 A1 | 6/2013 | Champagne et al. | |
| 2013/0151079 A1* | 6/2013 | Sworn | B62D 5/0463 701/42 |
| 2015/0066299 A1 | 3/2015 | Jang | |
| 2015/0142268 A1 | 5/2015 | Millsap et al. | |
| 2015/0246685 A1 | 9/2015 | Dixon | |

FOREIGN PATENT DOCUMENTS

| | | |
|---|---|---|
| CN | 102673641 A | 9/2012 |
| CN | 102917940 A | 2/2013 |
| WO | 2013061391 A1 | 5/2013 |

OTHER PUBLICATIONS

English translation of Chinese Office Action for related Chinese application No. 201410811051.2, dated: Jun. 1, 2016, pp. 3.
EP Search Report for EP Application No. 14189541.7 dated Mar. 19, 2015.

* cited by examiner

SYSTEMATIC ABNORMALITY DETECTION IN CONTROL COMMANDS FOR CONTROLLING POWER STEERING SYSTEM

CROSS-REFERENCES TO RELATED APPLICATIONS

This patent application is a divisional of U.S. patent application Ser. No. 14/518,370, filed Oct. 20, 2014, which claims priority to U.S. Provisional Patent Application Ser. No. 61/893,455, filed Oct. 21, 2013 and U.S. Provisional Patent Application Ser. No. 61/893,441, filed Oct. 21, 2013, the entire disclosures of which are incorporated herein by reference in their entirety.

BACKGROUND OF THE INVENTION

The International Organization for Standardization (ISO) 26262 Functional Safety standard provides functional safety management to facilitate the detection and mitigation of software systematic errors that could lead to an abnormal behavior of an automotive electric and electrical system. An example automotive electric and electrical system is an electric power steering system (EPS). For an EPS system, software systematic errors may lead to abnormal assist torque output. Prior software designs made use of software firewalls (generally, saturation limiters) to mitigate abnormalities that may cause an abnormal assist torque output. However, these saturation limiters in the assist torque calculation paths may also degrade the steering system performance as well as interfere with assist torque output calculation. Other software design measures, such as redundant memory storage and comparison of safety critical software variables, have been used as well. However, these design measures are often best applied to mitigate the hardware sources of abnormalities that affect the software computations. Accordingly, it is desirable to provide methods and systems that can mitigate abnormalities without affecting the steering system performance and assist torque calculation too much.

SUMMARY OF THE INVENTION

In one embodiment of the invention, a system of a vehicle includes a power steering system that operates as commanded by control commands, and a control module configured to receive a first control command. The control module is also configured to generate a range signal indicative of a range of command values based on a plurality of input signals, generate a second control command based on a subset of the plurality of input signals, determine whether the first control command is out of the range for longer than a predetermined duration of time, and send the second control command to the power steering system in response to determining the first control command is out of the range for longer than the predetermined duration of time.

In another embodiment of the invention, a system of a vehicle includes a power steering system that operates as commanded by control commands, and a control module configured to receive a first control command, generate a range signal indicative of a range of command values based on a plurality of input signals, determine whether the first control command is out of the range for longer than a predetermined duration of time, and limit the first control command to the range in response to determining that the first control command is out of the range for shorter than or equal to the predetermined duration of time.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
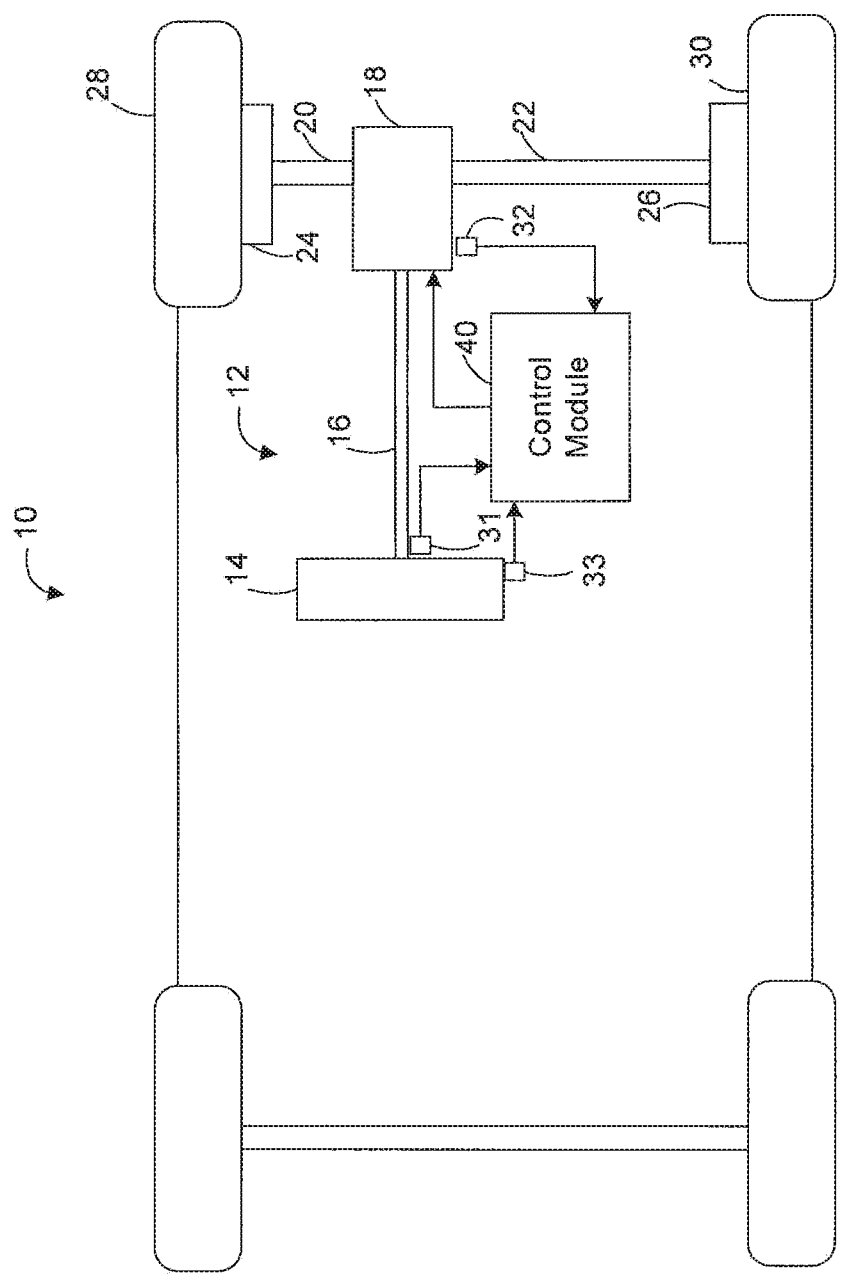
FIG. 1 is a functional block diagram of a steering system that includes a control system for controlling the steering system in accordance with exemplary embodiments.

The following description is merely exemplary in nature and is not intended to limit the present disclosure, its application or uses. It should be understood that throughout the drawings, corresponding reference numerals indicate like or corresponding parts and features.

Referring now to FIG. 1, where the invention will be described with reference to specific embodiments without limiting same, an exemplary embodiment of a vehicle 10 including a steering system 12 is illustrated. In various embodiments, the steering system 12 includes a hand wheel 14 coupled to a steering shaft 16. In one exemplary embodiment, the steering system 12 is an electric power steering (EPS) system that further includes a steering assist unit 18 that couples to the steering shaft 16 of the steering system 12 and to tie rods 20, 22 of the vehicle 10. The steering assist unit 18 includes, for example, a rack and pinion steering mechanism (not shown) that may be coupled through the steering shaft 16 to a steering actuator motor and gearing (hereinafter referred to as the steering actuator). During operation, as the hand wheel 14 is turned by a vehicle operator (driver), the motor of the steering assist unit 18 provides the assistance to move the tie rods 20, 22 which in turn moves steering knuckles 24, 26, respectively, coupled to roadway wheels 28, 30, respectively of the vehicle 10. Although an EPS system is illustrated in FIG. 1 and described herein, it is appreciated that the steering system 12 of the present disclosure can include various controlled steering systems including, but not limited to, steering systems with hydraulic configurations, and steer by wire configurations.

As shown in FIG. 1, the vehicle 10 further includes various sensors 31-33 that detect and measure observable conditions of the steering system 12 and/or of the vehicle 10. The sensors 31-33 generate sensor signals based on the observable conditions. In various embodiments, the sensors 31-33 include, for example, a hand wheel position sensor, a hand wheel torque sensor, a vehicle velocity sensor, a motor position sensor, and other sensors. In one embodiment, some of these sensors have redundant or backup sensors to validate or complement the sensor signals. The sensors 31-33 send the signals to a control module 40 or to other modules (not shown) that process one or more of the signals before sending the processed signals to the control module 40.

In various embodiments, a control module 40 controls the operation of the steering system 12 and/or the vehicle 10 based on one or more of the enabled sensor signals and further based on the assist torque calculation system and method of the present disclosure. Generally speaking, the method in various embodiments of the invention generates a control command signal (e.g., an assist torque command, a damping command, etc.) and then detects and mitigates any abnormalities included in the control command before sending it out to the steering system 12. Specifically, in an embodiment, the control module 40 generates a valid range of command values and limits the control command to the range. If the control command stays out of the range for a predetermined, threshold duration of time, the control module 40 of an embodiment sends out a default control command to the steering system 12 so that the steering system 12 operates all the time while the vehicle is in operation. In an embodiment, the control module 40 switches back to sending out the control command if the control command does not go out of the range for a duration of time.

Figure 2:
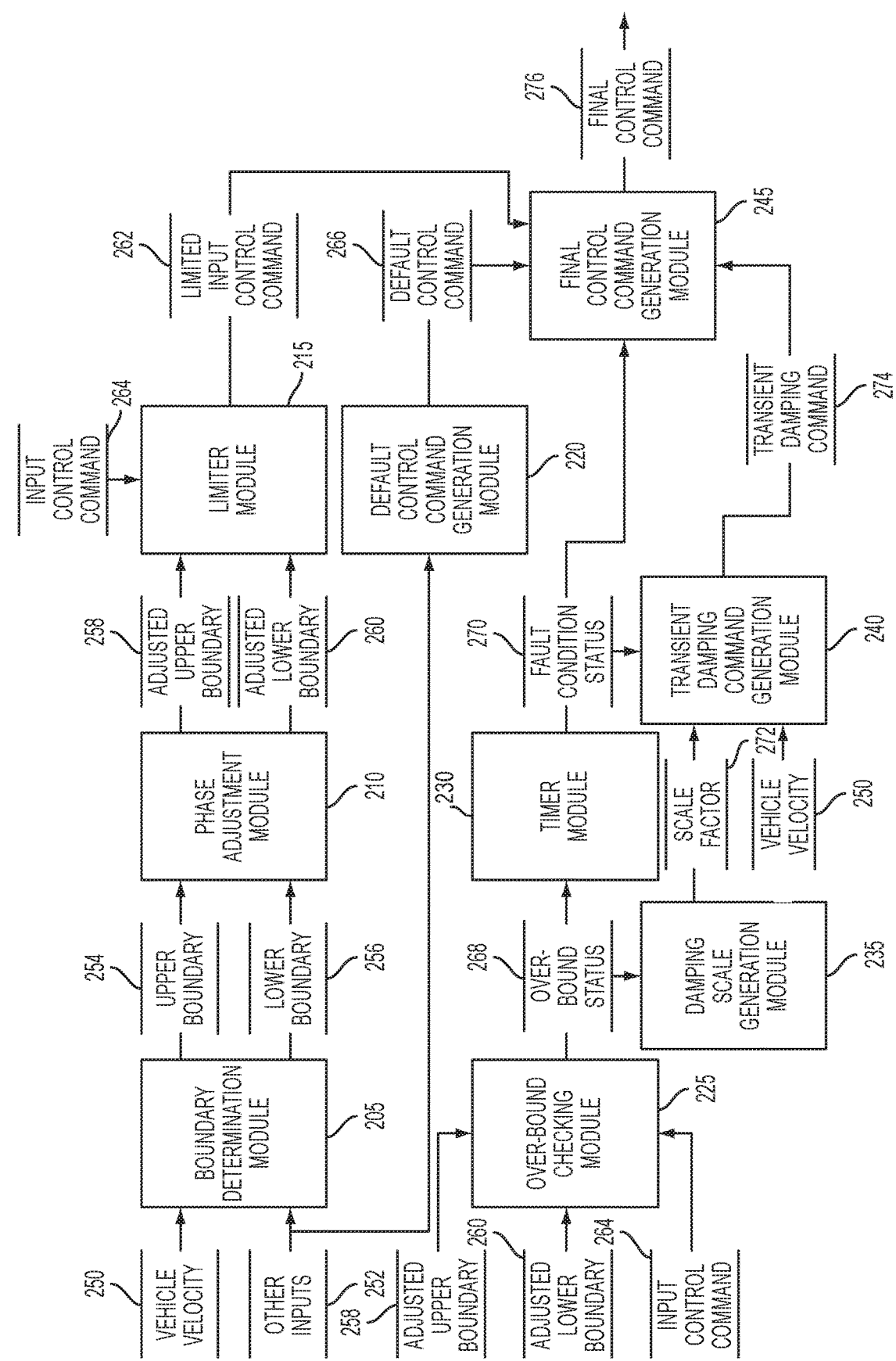
FIG. 2 is a block diagram of a control module that controls a steering system in accordance with exemplary embodiments of the invention.

FIG. 2 depicts a block diagram of the control module 40 of FIG. 1 that is used to control the steering system 12 and/or the vehicle 10 of FIG. 1 in accordance with some embodiments of the invention. In various embodiments, the control module 40 can include one or more sub-modules and datastores. As used herein the terms module and sub-module refer to an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules shown in FIG. 2 can be combined and/or further partitioned. As can be appreciated, the sub-modules shown in FIG. 2 can be implemented as a single control module 40 (as shown) or multiple control modules (not shown). Inputs to the control module 40 can be generated from the sensors of the vehicle 10 (FIG. 1), can be modeled within the control module 40 (e.g., by other sub-modules (not shown)), can be received from other control modules (not shown), and/or can be predefined. In one example, the control module 40 includes a boundary determination module 205, a phase adjustment module 210, a limiter module 215, a default command generation module 220, an over-bound checking module 225, a timer module 230, a damping scale generation module 235, a transient damping command generation module 240, and a final control command generation module 245.

The boundary determination module 205 takes as input a plurality of input signals originating from the sensors of the vehicle 10 (FIG. 1). In an embodiment, the plurality of input signals include a vehicle velocity signal 250 and other input signals 252. The other input signals 252 include one or more different sensor signals depending on the kind of input control command 264. For instance, when the input control command 264 is an assist torque command that specifies an amount of assist torque to be generated by the steering system 12, the input signals 252 include a hand wheel torque signal. When the input control command 264 is a damping control command for hand wheel damping, the input signals 252 include a motor velocity signal indicative of the rotational velocity of a motor of the steering assist unit 18 (FIG. 1).

Based on the signals 250 and 252, the boundary determination module 205 generates a range signal that is defined by an upper boundary signal 254 and a lower boundary signal 256. In an embodiment, the boundary determination module 205 uses one or more look-up tables storing boundary values that are indexed by different values of the vehicle velocity signal 250 and the input signals 252. As will be described further below, the range of command values between the upper boundary 254 and the lower boundary 256 is used for determining whether the input control command 264 is valid (e.g., not containing an abnormality) at a particular instance in time In an embodiment, the phase adjustment module 210 optionally synchronizes the phases of the upper boundary signal 254 and the lower boundary signal 256 to the phase of the input control command 264. The synchronization ensures that the input control command 264 is compared with the correct range of command values defined by the upper and lower boundary values. The phase adjustment module 210 outputs an adjusted upper boundary signal 258 and the adjusted lower boundary signal 260. In an embodiment, the phase adjustment module 210 implements two low pass filters for adjusting the phases of the upper boundary signal 254 and the lower boundary signal 257, respectively.

The limiter module 215 uses the adjusted upper boundary signal 258 and the adjusted lower boundary signal 260 to limit the input control command 264 to the range defined by the adjusted upper and lower boundaries 258 and 260. The output of the limiter module 215 is a limited input control command 262 generated by limiting the input control command 264 if the input control command 264 goes out of the range. If the input control command 264 is not out of the range, the limiter module 215 does not modify or limit the input control command 264, and thus a limited input control command 262 is the input control command 264.

In an embodiment, the control module 40 receives the input control command 264 from another module (not shown) of the vehicle 10, which generates the input control command 264 based on the signals from the sensors of the vehicle 10. In another embodiment, other sub-modules (not shown) of the control module 40 generates the input control command 264.

Figure 2A:
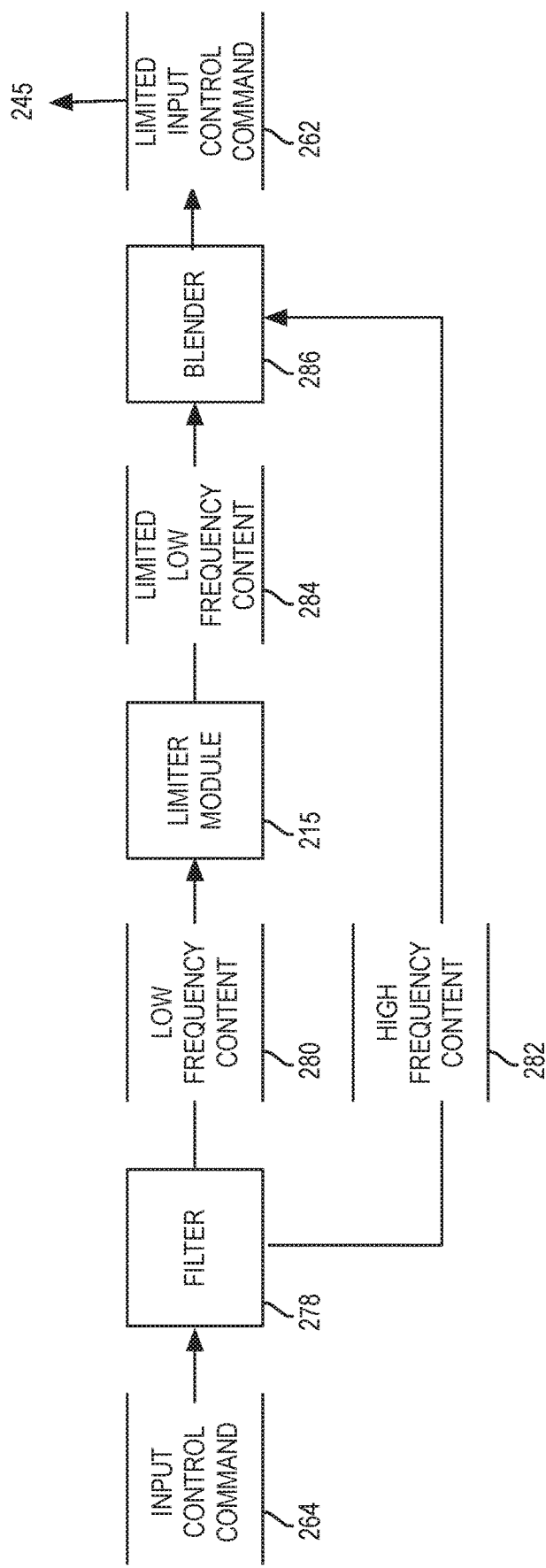
FIG. 2A is a block diagram of a portion of a control module that controls a steering system in accordance with exemplary embodiments of the invention.

FIG. 2A shows that, in one embodiment, when the input control command is an assist torque command, a filter 278 (e.g., a high pass filter or a low pass filter) splits the input control command into a low frequency content 280 and a high frequency content 282. In such an embodiment, only the lower frequency content is supplied to the limiter module 215. The limited input control command 264 generated from limiting this low frequency content 280 is then recombined with the high frequency content 282 by a blender 286. It is this recombined control command 262 that is supplied to the final control command generation module 245. Splitting the input control command 264 into low and high frequency contents, processing only the low frequency content, and combining the processed low frequency content and the high frequency content is described in U.S. Pat. No. 6,738,700, issued on May 18, 2008, which is incorporated herein in its entirety. In an embodiment, the input control command 264 may be a composite command—a combination of two or more control commands.

Referring back to FIG. 2, the default control command generation module 220 generates a default control command 266 that is a "backup" control command for the input control command 264, based on the input signals 252. As will be described further below, the default control command 266 is sent out to the steering system 12 when the control module 40 does not send out the input control command 264. The default control command 266 therefore allows that the steering system 12 is always operational and does not have to be shut down while the vehicle 10 is in operation.

The over-bound checking module 225 takes as inputs the input control command 264, the adjusted upper boundary signal 258, and the adjusted lower boundary signal 260 and generates an over-bound status signal 268 as an output signal. The over-bound checking module 225 determines whether the input control command 264 goes out of the range defined by the adjusted upper boundary signal 258 and the adjusted lower boundary signal 260. In an embodiment, if the input control command 264 goes out of the range, the over-bound checking module 225 sets the over bound status signal 268 to a value (e.g., one) that indicates that the input control command 264 is out of the range. If the input control command 264 does not go out of the range, the over-bound checking module 225 sets the over bound status signal 268 to a value (e.g., zero) that indicates that the input control command 264 is not out of the range.

In an embodiment, the timer module 230 maintains a counter (e.g., a PN-counter). The timer module 230 takes as input the over-bound status signal 268. The timer module 230 initially sets the counter to an initial value (e.g., zero) that indicates that the input control command 264 has not been out of the range. The timer module 230 of an embodiment then increments the counter when the over-bound signal 268 indicates that the input control command 264 is out of the range and decrements the counter when the over-bound signal 268 indicates that the input control command is not out of the range. The timer module 230 also compares the counter with a threshold counter value. If the counter becomes larger than the threshold counter value, the timer module 230 sets a fault or disabled condition status 270 to a value (e.g., one) that indicates that the input control command 264 has been erroneous and should not be used. If the counter stays smaller than or equal to the threshold counter value, the timer module 230 sets the fault condition status signal 270 to a value (e.g., zero) that indicates that the input control command 264 is usable. As can be recognized, the counter may be initially set to a number, be decremented when the input control command is out of the range, and be incremented when the input control command is not out of the range. In such a case, the timer module 230 sets the fault condition status signal 270 based on whether the counter goes below a threshold counter value.

The damping scale generation module 235 generates a scale factor signal 272 based on the over bound status signal 268. More specifically, in an embodiment, the damping scale generation module 235 initially sets the scale factor signal 272 to an initial value (e.g. zero) that indicates no transient damping force should be added to the input control command 264. As soon as the over-bound status signal changes to a value that indicates that the input control command 264 is out of the range, the damping scale generation module 235 starts ramping up the scale factor signal 272 from the initial value towards another value (e.g. one) that indicates that the transient damping force should be added to the input control command 264 at a full scale.

The transient damping command generation module 240 takes as inputs the scale factor signal 272 and the vehicle velocity signal 250. The transient damping command generation module 240 generates a transient damping command 274 based on the scale factor signal 272 and the vehicle velocity signal 250. Specifically, in an embodiment, the transient damping command generation module 240 determines an amount of damping command to add to the input control command 264 based on the vehicle velocity signal 250 by using, e.g., a look-up table that is indexed by different velocity values of the vehicle velocity signal 250. The transient damping command generation module 240 scales the determined amount of the damping force using the scale factor signal 272. For instance, the transient damping command generation module 240 multiplies the determined amount of the damping force by the scale factor signal 272 to generate the transient damping command 274. The transient damping command is for dissipating the faulty energy or force that may be generated by the steering system 12 if the faulty input control command 264 (i.e., the input control command 264 out of the range) is sent to the steering system 12. Because the default control command 266 is assumed to be not faulty, the transient damping command is added to the input control command 264 before the faulty input control command is replaced by the default control command 266.

The final control command generation module 245 takes as inputs the limited input control command 262, the default control command 266, the fault condition status signal 270, and the transient damping command 274 and generates a final control command 276 that is to be sent to the steering system 12 (FIG. 1). The final control command 276 generated by the final control command generation module 245 depends on the fault condition status signal 270. If the fault condition status signal 270 indicates that the input control command 264 is not usable (i.e., the counter maintained by the timer module 230 becomes larger than the threshold counter value), the final control command generation module 245 sends out the default control command 266 as the final control command 276. If the fault condition status signal 270 indicates that the input control command 264 is useable (i.e., the counter maintained by the timer module 230 is not larger than the threshold counter value), the final control command generation module 245 of an embodiment sends a sum of the limited input control command 262 and the transient damping command 274 as the final control command 276. It is to be noted that this sum is the input control command 264 if the input control command 264 is not out of the range defined by the adjusted upper and lower boundary signals 258 and 260 because the limited input control command 262 is the input control command 264 and the transient damping command 274 would be scaled to none. If the input control command 264 is out of the range, the limited input control command 262 is the input control command 264 limited to the range and the transient damping command 274 would be scaled to some amount of damping command to be added to the limited input control command 262.

Figure 3:
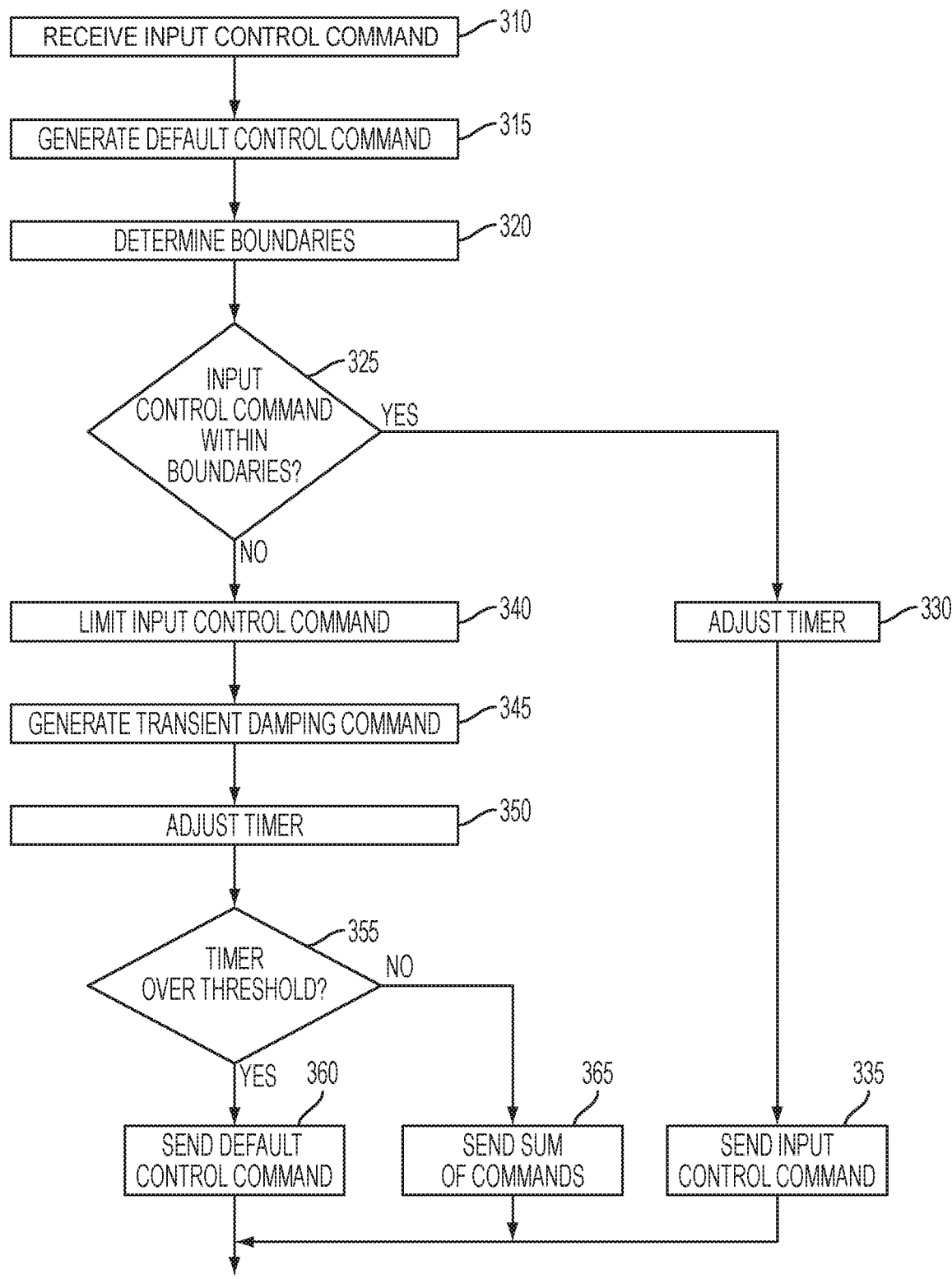
FIG. 3 is flow diagram illustrating a control method for controlling a steering system in accordance with exemplary embodiments.

An example operation of the control module 40 will now be described by reference to FIGS. 1-3. FIG. 3 is a flow diagram for a control method that can be performed by the control module 40 in accordance with some embodiments of the invention. As can be appreciated in light of the disclosure, the order of operation within the method is not limited to the sequential execution as illustrated in FIG. 3, but may be performed in one or more varying orders as applicable and in accordance with the present disclosure.

At block 310, the control module 40 receives an input control command 264. In an embodiment, the control module 40 receives this input control command 264 from another module (not shown in FIG. 1 or 2) of the vehicle 10. In another embodiment, the control module 40 generates the input control command 264 based on a plurality of input signals (e.g., the vehicle velocity signal 250 and the input signals 252). Like the input control command 264, the input signals are supplied to the control module 40 from another module or are generated by the control module 40.

At block 315, the control module 40 generates the default control command 226 based on the plurality of input signals 252. The plurality of input signals 252 include a hand wheel torque signal if the input control command is an assist torque command specifying an amount of assist torque force to be generated by the steering system 12. The plurality of input signals 252 include a motor velocity signal if the input control command 264 is a damping command.

At block 320, the control module 40 generates the range signal that is defined by the upper boundary signal 254 and the lower boundary signal 256. In an embodiment, the control module 40 uses one or more look-up tables storing boundary values that are indexed by different values of the vehicle velocity signal 250 and the input signals 252. In an embodiment, the control module 40 at block 320 also synchronizes the phases of the upper and lower boundary signals to the phase of the input control command 264.

At block 325, the control module 40 determines whether the input control command 264 is within the range defined by the upper and lower boundary signals 254 and 256. The control module 40 compares a value of the control command (e.g., an amount of assist torque) with the upper boundary signal value and the lower boundary signal value. If the control command value is smaller than or equal to the upper boundary signal value and larger than or equal to the lower boundary signal value, the control module 40 determines that the input control command 264 is within the range. If the control command value is larger than the upper boundary signal value or smaller than the lower boundary signal value, the control module 40 determines that the input control command 264 is out of the range.

When the control module 40 determines at block 325 that the input control command 264 is within the range defined by the upper and lower boundary values, the control module 40 adjusts at block 330 a counter by decrementing the counter if the counter is greater than a minimum value (e.g., zero). The control module 40 at block 335 sends out the input control command 264 to the steering system 12 as the final control command 276. That is, the control module 40 does not modify the input control command 264 before sending it out to the steering system 12.

When the control module 40 determines at block 325 that the input control command 264 is out of the range, the control module 40 limits at block 340 the input control command 264 to the range. That is, if the input control command value is above the upper boundary value of the range, the control module 40 reduces the input control command value to the upper boundary value. Likewise, if the input control command value is below the lower boundary value of the range, the control module 40 increases the input control command value to the lower boundary value.

At block 345, the control module 40 generates a transient damping command based on the vehicle velocity signal 250 and a damping scale factor signal 272. In an embodiment, the control module 40 generates the damping scale factor signal 272 using a low pass filter to make the value of the scale factor gradually rise from an initial value (e.g., zero) indicative of no damping force to be added to the input control command 264 as soon as the input control command starts to go out of the range. The control module 40 also generates a damping command signal to be added to the input control command 264.

At block 350, the control module 40 adjusts the counter by incrementing the counter. At block 355, the control module 40 determines whether the counter is larger than a threshold counter value. The counter being larger than the threshold counter value means that the input control command 264 has been out of the range for a predetermined duration of time that is long enough to conclude that the input control command 264 should be disabled or faulty. By using the counter that can be incremented or decremented, the control module 40 introduces a hysteresis in determining whether the input control command 264 is usable or not. That is, the use of counter prevents the input control command 264 from switching between fault condition and non-fault conditions too often.

When the control module 40 determines at block 355 that the counter is larger than the threshold counter value, the control module 40 sends out at block 360 the default control command generated at block 315 to the steering system 12 as the final control command 276. When the control module 40 determines at block 355 that the counter is smaller than or equal to the threshold counter value, the control module 40 generates at block 365 a sum of the transient damping command generated at block 345 and the input control command 264 received at the block 305. The control module 40 sends out the sum as the final control command 276. In an embodiment, the control module 40 at blocks 360 and 365 optionally generates and sends out a diagnostic trouble code (DTC) that indicates that the input control command 264 is out of the range.

Figure 4:
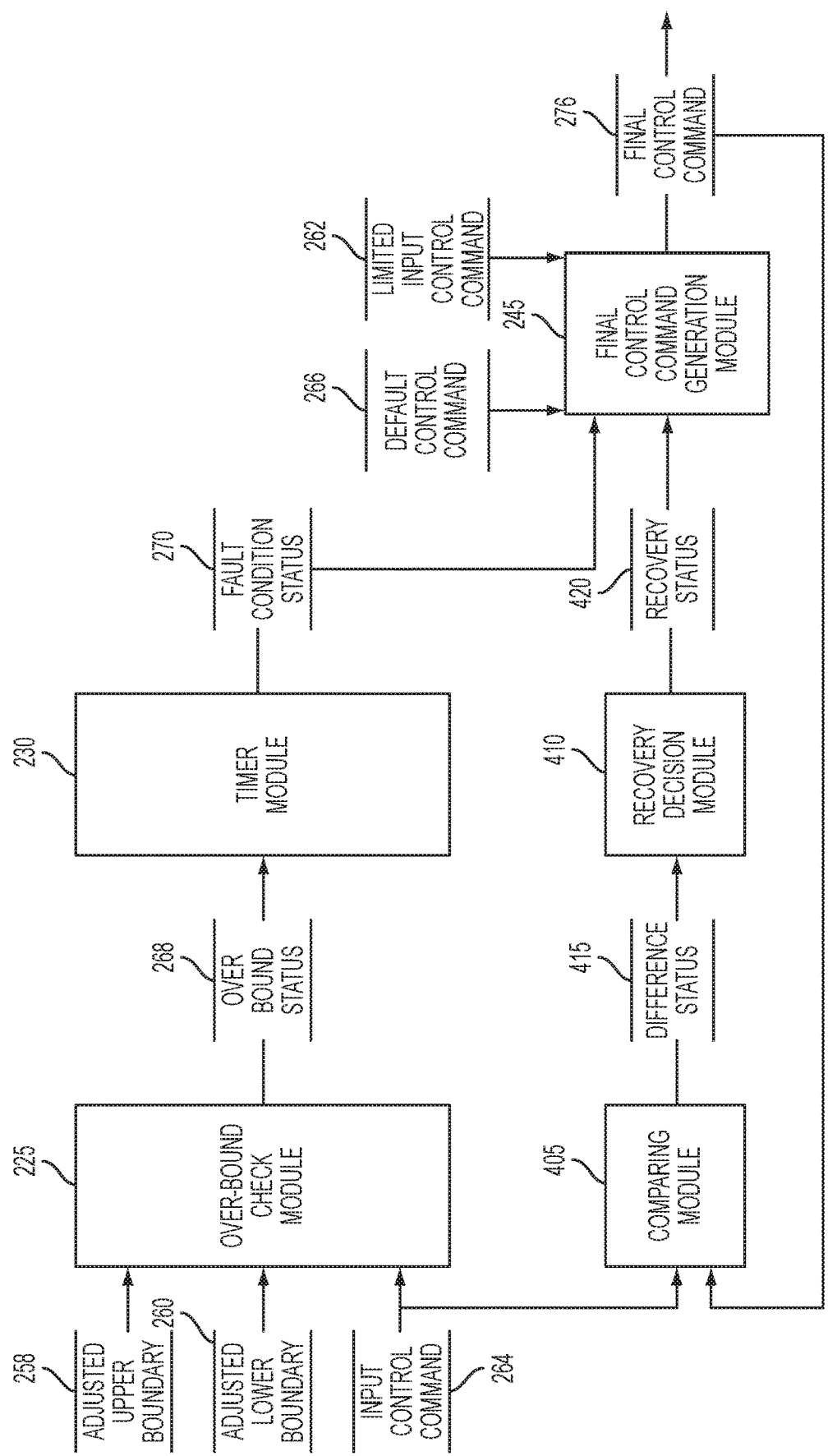
FIG. 4 a block diagram of a control module that controls a steering system in accordance with exemplary embodiments of the invention.

FIG. 4 depicts a block diagram of the control module 40 of FIG. 1 in accordance with some embodiments of the invention. In particular, the embodiments of the control module 40 illustrated in FIG. 4 is the same as the embodiments of the control module 40 illustrated in FIG. 2 except that FIG. 4 illustrates that the control module 40 additionally includes a comparing module 405 and a recovery decision module 410. The boundary determination module 205, the phase adjustment module 210, the limiter module 215, the default command generation module 220, the damping scale generation module 235, and the transient damping command generation module 240 of the control module 40 as well as the input and output signals of these modules are not shown in FIG. 4 for the simplicity of illustration and description.

As described above, the final control command generation module 245 sends out the default control command 266 to the steering system 12 (FIG. 1) as the final control command 276 when the fault condition status signal 270 indicates that the input control command 264 is not usable (i.e., the counter maintained by the timer module 230 becomes lager than the threshold counter value).

In an embodiment, after the final control command generation module 245 starts sending out the default control command 266 to the steering system 12, the over-bound checking module 225 keeps determining whether the input control command 264 is out of the range defined by the adjust upper and lower boundary signals 258 and 260. The timer module 230 keeps maintaining the counter after the final control command generation module 245 starts sending out the default control command 266. That is, the timer module 230 keep incrementing or decrementing the counter based on the over-bound status signal 268 generated by the over-bound checking module 225. In an embodiment, however, the timer module 230 caps the counter value at the threshold counter value. Specifically, the timer module 230 sets the counter to the threshold counter value as soon as the counter becomes greater than the threshold counter value and does not subsequently increment the counter above the threshold counter value even if the over bound status signal 268 indicates that the input control command 264 stays out of the range. In an embodiment, this threshold counter value may be different than the threshold counter value used for determining to switch to the default control command 266.

When the counter is decremented to the initial value (e.g. zero), the timer module 230 sets the fault condition status signal 270 to a value (e.g., zero) that indicates the input control command 264 is usable. The timer module 230 sends the fault condition status signal 270 to the recovery decision module 410.

The comparing module 405 monitors the input control command 264 and the final control command 276. In an embodiment, the comparing module 405 compares the input control command 264 and the final control command to generates a difference status signal 415 that indicates whether the input control command 264 and the final control command 276 sent out to the steering system 12 is within a threshold difference. When the final control command 276 is the default control command 266, the comparing module 405 compares the input control command 264 and the default control command 266.

The recovery decision module 410 determines whether to switch back from the default control command 266 to the input control command 410 based on the fault condition status signal 270 and the difference status signal 415. Specifically, in an embodiment, the recovery decision module 410 determines that the input control command 264 should be reinstated as the final control command 276 when the following two conditions are met. The first of the two conditions is that the fault condition status signal switches from a value (e.g., one) that indicates that the input control command 264 is not usable to another value (e.g., zero) that indicates that the input control command 264 is usable. The second of the two conditions is that the difference status signal 415 indicates that the default control command 266 and the input control command 264 are within the threshold difference. This second condition is checked to ensure that a transition from the default control command 266 to the input control command 264 is smooth. For instance, when the input control command 264 is an assist torque command, the recovery decision module 410 makes sure that the transition from a default assist torque command to the assist torque command is smooth and not causing any discontinuous feel on the hand wheel. More specifically, for example, time-based blending of the default control command and the input control command may be employed to ensure a smooth transition.

The recovery decision module 410 generates a recovery status signal 420 reflecting the decision on whether to switch back from the default control command 266 to the input control command 264. The final control command generation module 245 replaces the default control command 266 with the input control command 264 as the final control command 276 to be sent to the steering system 12 when the recovery status signal 420 indicates that the switch should happen.

Figure 5:
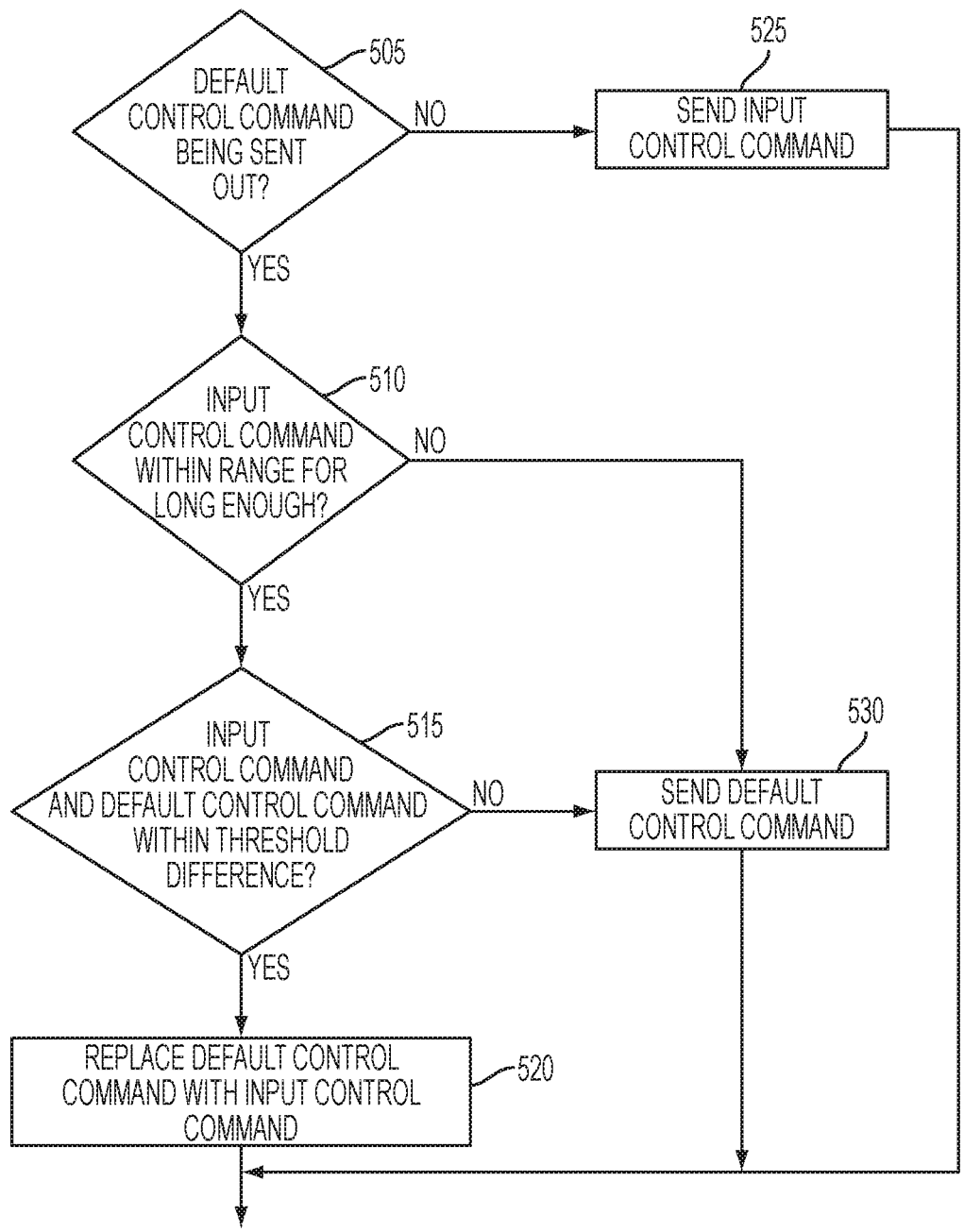
FIG. 5 is flow diagram illustrating a control method for controlling a steering system in accordance with exemplary embodiments.

An example operation of the embodiments of the control module 40 shown in FIG. 4 will now be described by reference to FIGS. 1-5. FIG. 5 is a flow diagram for a control method that can be performed by the control module 40 in accordance with some embodiments of the invention. As can be appreciated in light of the disclosure, the order of operation within the method is not limited to the sequential execution as illustrated in FIG. 5, but may be performed in one or more varying orders as applicable and in accordance with the present disclosure.

At block 505, the control module 40 determines whether the default control command 266 is being sent out to the steering system 12 as the final control command 276. If the default control command 266 is not being sent out, the control module 40 proceeds to block 525 to continue to send out the input control command 264 or a sum of the input control command 264 and the transient damping command 274.

When the control module 40 determines at block 505 that the default control command 266 is being sent out, the control module 40 determines at block 510 whether the input control command 264 has been staying within the range defined by the upper and lower boundary value signals 258 and 260 for a long enough duration of time to be reinstated. In an embodiment, the control module 40 uses a counter to determine whether the input control command 264 has been within the range for a threshold duration of time. Specifically, for example, the control module 40 decrements the counter when the input control command 264 stays in the range and increments the counter when the input control command 264 goes out of the range. The control module 40 determines that the input control command 264 may be reinstated when the counter is decremented to a value (e.g., zero) that indicates the input control command 264 has stayed in the range for a threshold duration of time.

When the control module 40 determines at block 510 that the input control command 264 has not been staying within the range for the threshold duration of time, the control module 40 proceeds to block 530 to continue to send out the default control command 266. When the control module 40 determines at block 510 that the input control command 264 has been staying within the range for the threshold duration of time, the control module 40 proceeds to block 515 to determine whether the input control command 264 and the default control command 266 are within a threshold difference. In an embodiment, the control module 40 subtracts the input control command 264 from the default control command 266 to compute a difference signal indicating the difference between the commands 264 and 266. The control module 40 determines that the difference is within the threshold difference if the difference signal drops below the threshold difference.

When the control module determines at block 515 that the input control command 264 and the default input control command 266 are not within the threshold difference, the control module 40 at block 530 continues to send out the default control command 266. When the control module determines at block 515 that the input control command 264 and the default control command 266 are within the threshold difference, the control module 40 at block 520 replaces the default control command 266 with the input control command 264 as the final control command 276 to be sent out to the steering system 12.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

The invention claimed is:
1. A system of a vehicle comprising:
a power steering system that operates as commanded by control commands;
a control module configured to:
receive a first control command;
generate a range signal indicative of a range of command values based on a plurality of input signals;
generate a second control command based on a subset of the plurality of input signals;
determine whether the first control command is out of the range for longer than a predetermined duration of time; and
send the second control command to the power steering system in response to determining the first control command is out of the range for longer than the predetermined duration of time, wherein the control module is further configured to:
in response to determining that the first control command is out of the range for shorter than or equal to the predetermined duration of time, limit the first control command to the range, generate a scale factor signal by starting to increase a scale factor from an initial value as soon as the first control command goes out of the range, generate a damping command based on a vehicle velocity signal and the scale factor signal, blend the limited first control command with the damping command, and send the blended command to the power steering system;
in response to determining that the first control command is out of the range for longer than the predetermined duration of time, send the second control command to the power steering system; and
generate an amount of assist torque by the power steering system based on the blended command or the second control command.

2. The system of claim 1, wherein the control module is further configured to limit the first control command to the range and send the limited first control command to the power steering system in response to determining the first control command is out of the range for shorter than or equal to the predetermined duration of time.

3. The system of claim 1, wherein the control module is further configured to generate the range signal by varying an upper boundary value of the range and a lower boundary value of the range based on the plurality of input signals.

4. The system of claim 1, wherein the control module is further configured to synchronize a phase of the range signal and a phase of the first control command.

5. The system of claim 1, wherein the control module is further configured to:
determine whether the first control command has stayed within the range for longer than another predetermined duration of time while sending out the second control command;
determine whether the first control command and the second control command are within a threshold difference; and
send the first control command to the steering command instead of the second control command if the first control command has stayed within the range for longer than the other predetermined duration of time and if the first control command and the second control command are within the threshold difference.

6. The system of claim 1, wherein the subset of the plurality of input signals includes at least one of a hand wheel torque signal, a hand wheel angular position signal and a hand wheel velocity signal.

7. The system of claim 1, wherein the control module is further configured to:
increment a counter in response to determining that the first control command is out of the range;
decrement the counter in response to determining that the first control command is not out of the range;
compare the counter to a threshold counter value;
determine that the first control command is out of range for longer than the predetermined duration of time if the counter is greater than the threshold counter value; and
determine that the first control command is out of range for less than or equal to the predetermined duration of time if the counter is less than or equal to the threshold counter value.

8. The system of claim 1, wherein the first control command is generated based on at least one of a hand wheel velocity signal and a hand wheel torque signal.

9. A system of a vehicle comprising:
a power steering system that operates as commanded by control commands;
a control module configured to:
receive a first control command;
generate a range signal indicative of a range of command values based on a plurality of input signals;
determine whether the first control command is out of the range for longer than a predetermined duration of time; and
limit the first control command to the range in response to determining that the first control command is out of the range for shorter than or equal to the predetermined duration of time, wherein the control module is further configured to:
in response to determining that the first control command is out of the range for shorter than or equal to the predetermined duration of time, generate a scale factor signal by starting to increase a scale factor from an initial value as soon as the first control command goes out of the range, generate a damping command based on a vehicle velocity signal and the scale factor signal, blend the limited first control command with the damping command, and send the blended command to the power steering system;
in response to determining that the first control command is out of the range for longer than the predetermined duration of time, generate a second control command based on a subset of the plurality of input signals and send the second control command to the power steering system; and
generate an amount of assist torque by the power steering system based on the blended command or the second control command.

10. The system of claim 9, wherein the control module is further configured to send the limited first control command to the power steering system in response to determining that the first control command is out of the range for shorter than or equal to the predetermined duration of time.

11. The system of claim 9, wherein the control module is further configured to:
generate a second control command based on a subset of the plurality of input signals; and
send the second control command to the power steering system in response to determining the first control command is out of the range for longer than the predetermined duration of time.

12. The system of claim 11, wherein the subset of the plurality of input signals includes at least one of a hand wheel torque signal, a hand wheel angular position signal and a hand wheel velocity signal.

13. The system of claim 9, wherein the control module is further configured to generate the range signal by varying an upper boundary value of the range and a lower boundary value of the range based on the plurality of input signals.

14. The system of claim 9, wherein the control module is further configured to synchronize a phase of the range signal and a phase of the first control command.

15. The system of claim 9, wherein the control module is further configured to determine whether the first control command is out of the range for longer than the predetermined duration of time based on using a counter.

16. The system of claim 9, wherein the control module is further configured to:

increment a counter in response to determining that the first control command is out of the range;

decrement the counter in response to determining that the first control command is not out of the range;

compare the counter to a threshold counter value;

determine that the first control command is out of range for longer than the predetermined duration of time if the counter is greater than the threshold counter value; and determine that the first control command is out of range for less than or equal to the predetermined duration of time if the counter is less than or equal to the threshold counter value.

17. The system of claim 9, wherein the control module is further configured to:

determine whether the first control command has stayed within the range for longer than another predetermined duration of time while sending out the second control command;

determine whether the first control command and the second control command are within a threshold difference; and send the first control command to the steering command instead of the second control command if the first control command has stayed within the range for longer than the other predetermined duration of time and if the first control command and the second control command are within the threshold difference.

18. The system of claim 9, wherein the first control command is generated based on at least one of a hand wheel velocity signal and a hand wheel torque signal.

* * * * *